(12) United States Patent
Irwin et al.

(10) Patent No.: US 7,317,175 B2
(45) Date of Patent: Jan. 8, 2008

(54) USER INTERFACE FOR CONFIGURING AND CONTROLLING AN ARRAY OF HEATER ELEMENTS

(75) Inventors: Jere F. Irwin, P.O. Box 10668, Yakima, WA (US) 98909-1668; Marian J. Fisk, Naches, WA (US)

(73) Assignee: Jere F. Irwin, Yakima, WA (US)

( * ) Notice: Subject to any disclaimer, the term of this patent is extended or adjusted under 35 U.S.C. 154(b) by 0 days.

(21) Appl. No.: 10/877,077

(22) Filed: Jun. 24, 2004

(65) Prior Publication Data

US 2004/0262800 A1 Dec. 30, 2004

Related U.S. Application Data

(60) Provisional application No. 60/482,571, filed on Jun. 24, 2003.

(51) Int. Cl.
*H05B 1/02* (2006.01)
(52) U.S. Cl. ........................ 219/494; 219/385; 219/390; 425/143
(58) Field of Classification Search ................ 219/385, 219/388, 390–391, 395, 398, 413, 482–483, 219/486, 494; 264/40.6; 425/143
See application file for complete search history.

(56) References Cited

U.S. PATENT DOCUMENTS

| | | | | |
|---|---|---|---|---|
| 4,371,246 A * | 2/1983 | Siryj | ............................ | 219/388 |
| 4,416,623 A * | 11/1983 | Takahashi | .................... | 219/390 |
| 5,242,156 A * | 9/1993 | Kay | ............................ | 266/105 |
| 5,842,013 A | 11/1998 | Kopp | .......................... | 395/670 |
| 5,893,994 A | 4/1999 | Irwin et al. | ................. | 219/388 |
| 6,084,375 A | 7/2000 | Irwin et al. | ................. | 318/569 |
| 6,168,064 B1 * | 1/2001 | Berkin | ........................ | 219/388 |
| 6,242,877 B1 | 6/2001 | Irwin et al. | ................. | 318/557 |
| 6,655,946 B2 * | 12/2003 | Foreman et al. | ............ | 425/145 |
| 6,690,400 B1 | 2/2004 | Moayyad et al. | ........... | 345/779 |
| 2003/0085216 A1* | 5/2003 | Richert et al. | .............. | 219/388 |

OTHER PUBLICATIONS

U.S. Appl. No. 10/460,933, filed Jun. 12, 2003.

* cited by examiner

*Primary Examiner*—K. Richard Lee
(74) *Attorney, Agent, or Firm*—Wells St. John P.S.

(57) ABSTRACT

An oven control system and user interface are provided for setting a target temperature for different zones within an oven. A thermocouple is provided in each zone within the oven to monitor the realized temperature within the specific zone of the oven. A plurality of different heater elements are also provided within each zone of the oven. The control system enables a user to easily and efficiently select a target setpoint temperature for each zone within the oven, or for the chair rail, or the sag rails. For the case of the oven, the setpoint provides a virtual heat setpoint for the complete oven section which is then realized by controllably regulating operation of the various unique heating elements within that zone of the oven to realize the desired setpoint temperature within that specific zone of the oven. Such control is realized by way of proportional integral differential (PID) loops that are adjusted for each of the heater elements in order to realize the desired virtual heat setpoint for the specific zone of the oven.

52 Claims, 14 Drawing Sheets

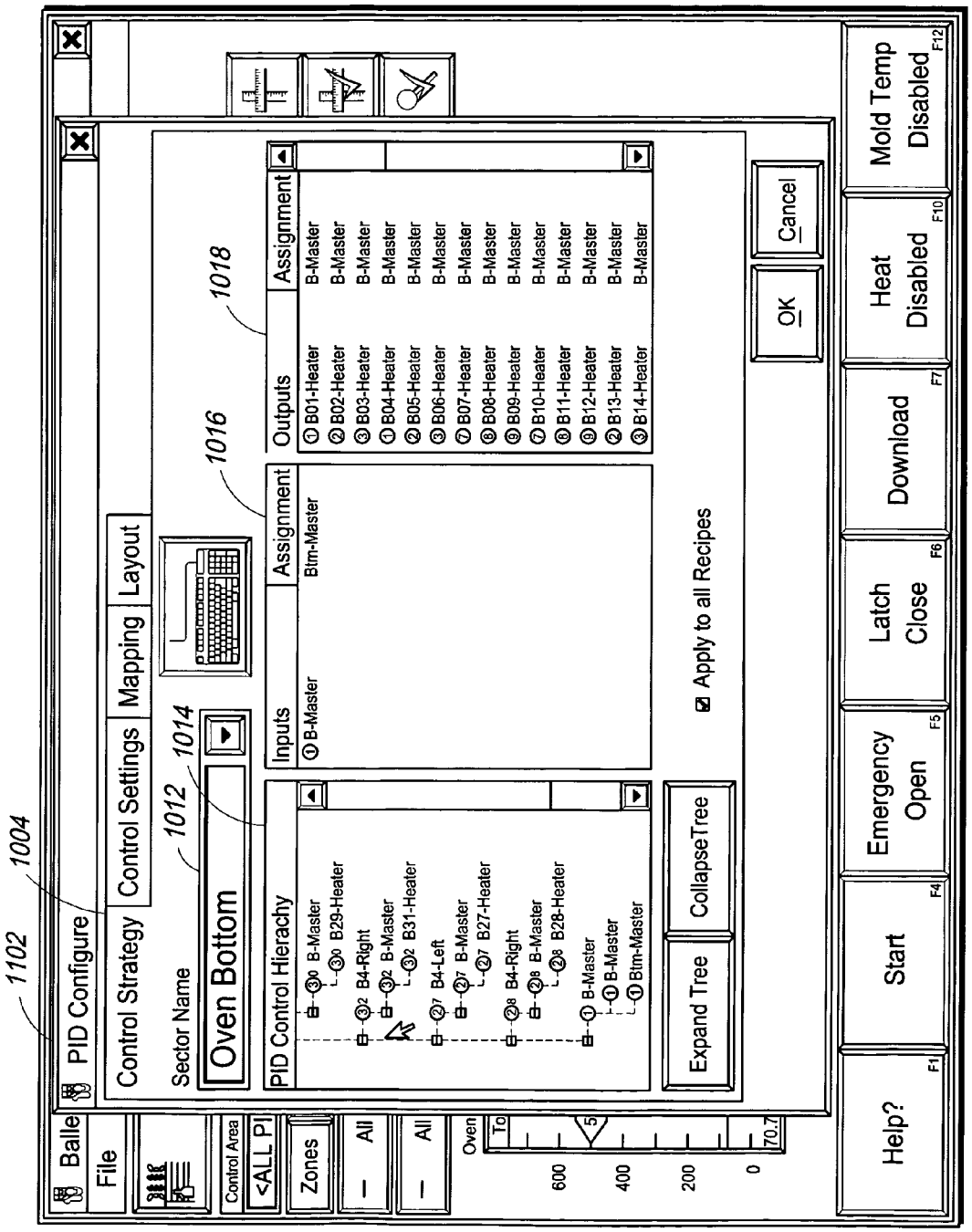

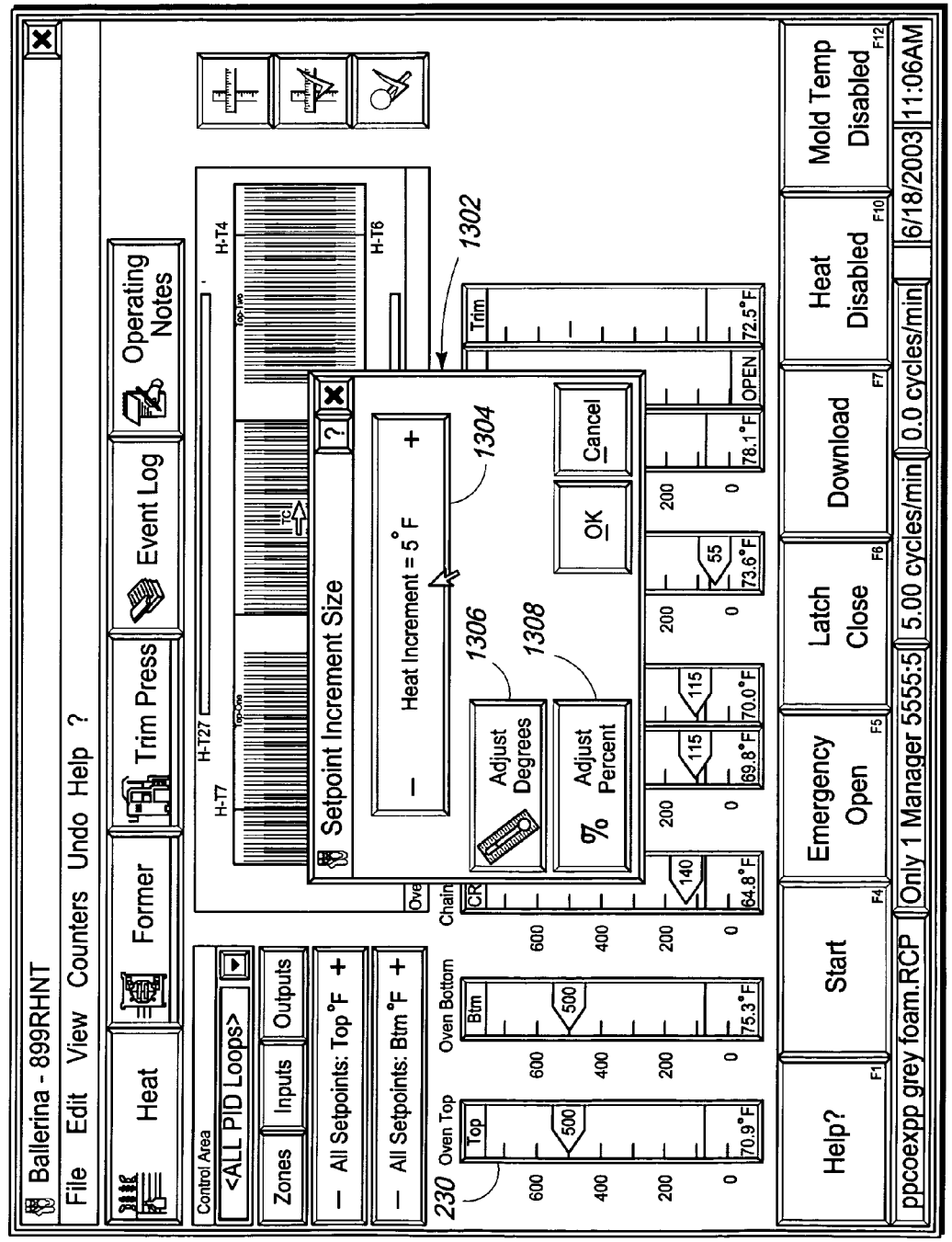

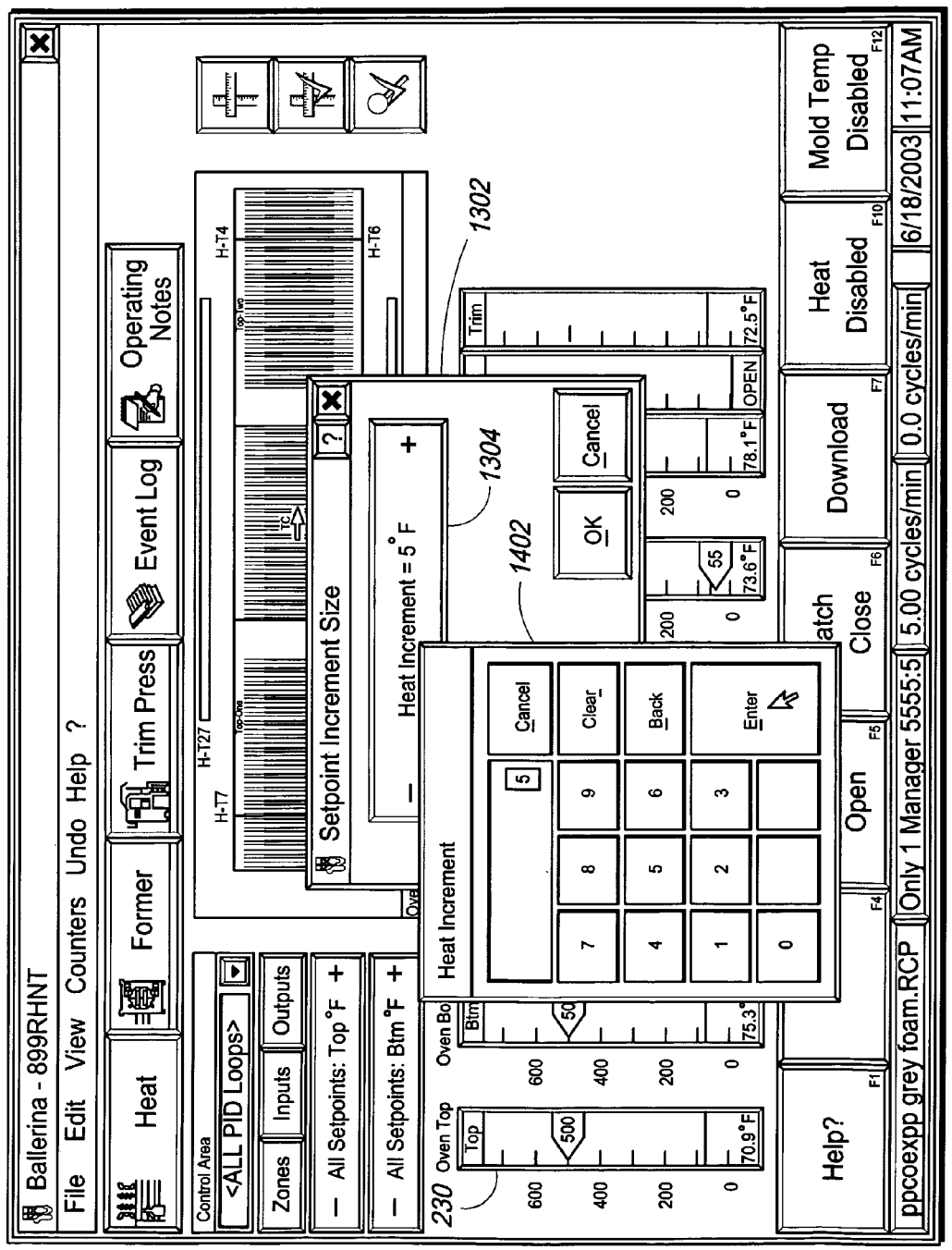

USER INTERFACE FOR CONFIGURING AND CONTROLLING AN ARRAY OF HEATER ELEMENTS

RELATED PATENT DATA

This application claims priority from U.S. Provisional Patent Application Ser. No. 60/482,571, which was filed Jun. 24, 2003, and which is incorporated by reference herein.

TECHNICAL FIELD

This invention pertains to control systems for thermoforming machines. More particularly, the present invention relates to a user interface, control system and method for configuring multiple heater elements within zones of a thermoforming oven.

BACKGROUND OF THE INVENTION

Ovens are used to preheat a web of material during the manufacture and forming of products from sheets or webs of plastic material into groups of plastic thin-walled articles. Typically, the oven forms a part of a thermoforming machine having a thermoforming press. A number of different articles can be formed from a sheet or web of plastic material as it is fed from a storage roll. Accordingly, a thermoforming press produces a large quantity of molded articles by intermittently passing a progressing succession of adjacent sections, or shot lengths of web, into the press, after which the web is stamped or formed.

A typical prior oven construction consists of an elongate oven having open leading and trailing ends. Heating elements inside the oven, for example, resistance heaters, operate to heat successive portions of a sheet as it is intermittently delivered into the thermal forming press at a desired molding temperature. However, the ability to properly heat a continuous thermoformable plastic sheet or web of material to a desired temperature depends upon the amount of energy transferred to the sheet, which is, in part, dependent upon the amount of time that the web passes through the oven. Typical oven constructions utilize an oven body having a finite length. Therefore, in order to tailor heat delivery to a thermoformable plastic sheet prior to feeding the sheet into a thermoforming press requires an adjustment of the stationary time that the web sits within the press and oven.

One problem encountered when attempting to adjust the heat delivery to a thermal forming sheet passing through a finite length oven is the necessity of tailoring the oven length to the particular application, or adjusting the stop time during which the thermoforming press has locked the web in a stationary position. In normal operations, it is desirable to increase production rate. Therefore, it is desirable to operate a thermoforming press in as short a cycle time as is physically possible by the constraints of the press operation and web deformation between pairs of interlocking dies. Therefore, it is desirable to tailor heat delivery to the web through some other means. One possibility is to controllably adjust the heat output from each of the thermal resistance elements carried within an oven. However, such an attempt at heat delivery requires careful monitoring of heat being delivered and time during activation for each of the elements. Hence, a complex control scheme is needed to track and target heat and delivery values for each of the elements in an oven.

Although control systems are known for controlling heater elements within a heater oven of a thermoforming line, the ability to precisely realize desired temperatures within a heater oven when heating thermoformable plastic material is particularly desirable in order to achieve high production rates and uniformity of product when thermoforming articles from a heated thermoformable plastic material.

SUMMARY OF THE INVENTION

A heater control system and graphical user interface are provided for realizing desired setpoint temperatures in the top and bottom zones of a thermoforming oven. Furthermore, a temperature-regulating circuit is provided in a chain rail and the control system enables regulation of temperature at the chain rail using a setpoint system similar to the system used for setting temperature of individual heater elements in the oven. Even furthermore, a temperature-regulating circuit is provided within sag rails of a conveyor used to convey the web of material through the oven. The temperature-regulating circuit in the sag rail and the chain rail are each provided by air which is heated or cooled to a desired setpoint temperature. The control system enables the setting of a targeted setpoint for the top of the oven, the bottom of the oven, the chain rail, and the air sag rails within the thermoforming oven.

According to one aspect, an oven control system and user interface are provided for setting a target temperature for different zones within an oven. A thermocouple is provided in each zone within the oven to monitor the realized temperature within the specific zone of the oven. A plurality of different heater elements are also provided within each zone of the oven. The control system enables a user to easily and efficiently select a target setpoint temperature for each zone within the oven, or for the chair rail, or the sag rails. For the case of the oven, the setpoint provides a virtual heat setpoint for the complete oven section which is then realized by controllably regulating operation of the various unique heating elements within that zone of the oven to realize the desired setpoint temperature within that specific zone of the oven. Such control is realized by way of proportional integral differential (PID) loops that are adjusted for each of the heater elements in order to realize the desired virtual heat setpoint for the specific zone of the oven.

According to another aspect, a control system is provided for controlling the temperature of a thermoforming oven. The control system includes a plurality of temperature-regulating devices, at least some of which are located in select individual zones of the thermoforming oven. The plurality of temperature-regulating devices are individually configured to regulate the temperature of the thermoforming oven. A target setpoint temperature of the select individual zones is set by a user, and the target setpoint temperature is realized by controlling the temperature of one or more of the temperature-regulating devices.

According to yet another aspect, a user interface is provided for controlling the temperature of a thermoforming oven. The user interface includes a plurality of menu driven icons individually configured to control one or more functions of the thermoforming oven. At least some of the icons are configured to establish a target setpoint temperature for individual zones of the thermoforming oven, and the oven includes at least a plurality of temperature-regulating devices individually configured to regulate the temperature of the thermoforming oven. The user interface is configured to realize the target setpoint temperature by controlling one or more of the temperature-regulating devices.

According to yet even another aspect, a sag rail temperature regulation system is provided for controlling the temperature of a thermoforming oven. The sag rail temperature regulation system includes a user interface having a plurality of menu driven icons individually configured to control one or more functions of the thermoforming oven. At least some of the icons are configured to establish a target setpoint temperature for select individual zones of the thermoforming oven, and at least one of the individual zones has a sag rail provided therein for temperature regulation. The target setpoint temperature is set via the user interface, and is realized by regulating temperature of the sag rail.

According to a further aspect, a thermoforming oven thermal regulating circuit is provided. The thermal regulating circuit includes a chain rail, a sag rail, a plurality of heater elements, and a user interface. The chain rail, the sag rail, and the plurality of heater elements are selectively disposed in individual zones of a thermoforming oven. A user interface having a plurality of menu driven icons is configured to establish a setpoint temperature of the thermoforming oven, and is further configured to realize the established setpoint temperature by selectively controlling the temperature of the chain rail, the sag rail, and select ones of the heater elements.

According to an even further aspect, a system is provided for regulating temperature in a thermoforming oven. The system includes a plurality of thermal regulating devices and a user interface. The plurality of thermal regulating devices are provided in the thermoforming oven. The user interface is configured to selectively control the temperature of the regulating devices to regulate the temperature of the thermoforming oven.

According to a yet even further aspect, a thermoforming oven temperature regulation method is provided. The method includes: providing a user interface; displaying a menu configuration having a plurality of control icons on the user interface; selecting one or more temperature-regulating devices using the control icons, the one or more temperature-regulating devices being provided in individual zones of the thermoforming oven; and selectively regulating the temperature of the one or more temperature-regulating devices via the user interface by manipulating a graphical gauge to control the temperature of the thermoforming oven.

According to an additional aspect, a thermoforming oven temperature regulation method is provided using a user interface. The method includes: providing a plurality of temperature-regulating devices at least some of which being located in a thermoforming oven; enabling a user to set a target setpoint temperature for the thermoforming oven via the user interface using a graphical gauge; and realizing the target setpoint temperature by controlling the temperature of at least some of the temperature-regulating devices via the user interface.

BRIEF DESCRIPTION OF THE DRAWINGS

Preferred embodiments of the invention are described below with reference to the following accompanying drawings.

FIG. 12 is a diagram of a screen display of the heater control system of FIGS. 2-11 and further illustrating the "PID Configure" menu for the control strategy for the oven bottom section of the oven (or heater), and showing the PID control hierarchy, inputs and outputs as they are assigned to a specific master (or thermocouple);

FIG. 13 is a diagram of a screen display for the heater control system of FIGS. 2-12 and illustrating a pop-up menu for setting "Setpoint Increment Size" for a heat increment for one of the elements of the oven, such as the oven top or the oven bottom;

FIG. 14 is a diagram of a screen display for the heater control system of FIGS. 2-13 and further illustrating a heat increment calculator that is displayed after selecting the "Adjust Degrees" button from the "Setpoint Increment Size" window of FIG. 13.

DETAILED DESCRIPTION OF THE PREFERRED EMBODIMENTS

Reference will now be made to a preferred embodiment of Applicants' invention. While the invention is described by way of a preferred embodiment, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
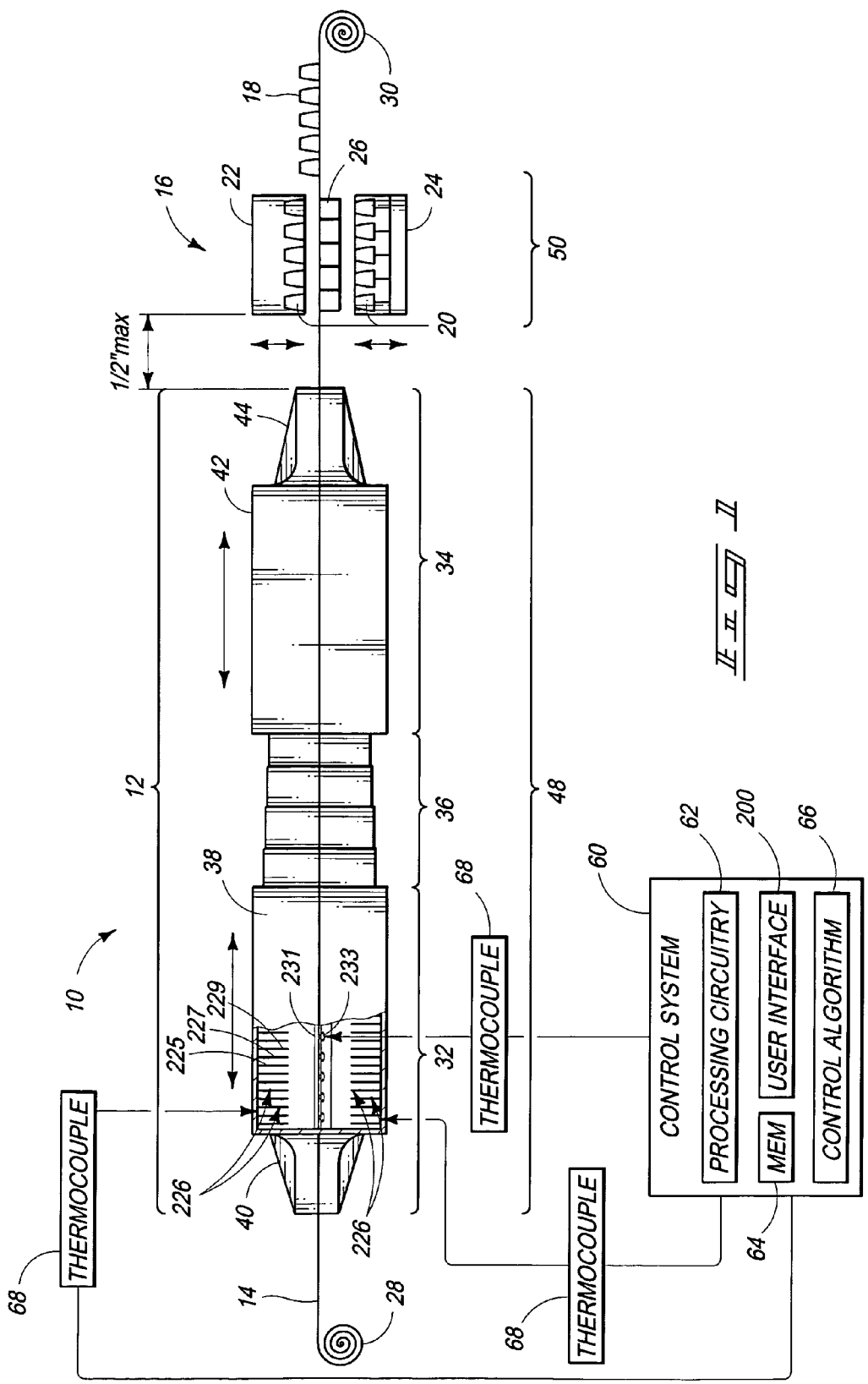
FIG. 1 is a schematic side view representation of an adjustable length heat tunnel and thermoforming press which together form a thermoforming machine according with one embodiment of the invention.

FIG. 1 shows a thermo-forming machine is generally designated with the reference numeral 10. Machine 10 includes an adjustable length heat tunnel, or oven 12. A web 14 of thermoformable plastic material is passed through the tunnel 12 and into a thermoforming press 16. Tunnel 12 is constructed to have an adjustable length, enabling production and delivery of a desired amount of heat energy to a web 14 of thermoformable plastic material as it is being delivered through the tunnel 12 and into a thermoforming press 16. A plurality of thin-walled articles 18 are produced from the web by pairs of mating male and female die assemblies 20. Each die assembly is formed from a pair of mating male and female dies that are carried by an upper platen 22 and a lower platen 24, respectively. Upper platen 22 is lowered into contact with a clamping grid 26 to lock in position the web, after which the lower platen 24 is raised during the molding of articles 18. Typically, lower platen 24 includes a support member having a plurality of male die members that are raised from the lower platen, causing the web to be drawn into cavities within the upper platen 22.

According to FIG. 1, web 14 is delivered in an intermittent and metered manner from a storage roll 28 through tunnel 12 and press 16 by activating one or more servo drives. Typically, the web 14 is supported by a plurality of rollers. At least one pair of the rollers, mated together on opposite sides of web 14, is driven by a servo drive, causing the web 14 to be fed upon activation of the servo drive. Activation of the pair of rollers delivers the web through tunnel 12 and press 16 onto a waste storage roll 30. In one system, articles 18 are simultaneously severed from web 14 after formation in press 16. In another version, articles 18 must be removed from web 14 after they are thermoformed by implementing a secondary cutting operation. In the latter case, the remaining scrap web is wound onto storage web 30 for subsequent reprocessing. Alternatively, the scrap web is subdivided in a comminuting apparatus.

Further referring to FIG. 1, the heat tunnel 12 is formed from a leading oven member 32, a trailing oven member 34 and a telescoping and medially positioned tunnel assembly 36. Telescoping tunnel assembly 36 is supported and sealed at either end to members 32 and 34, respectively. One or more heat sources are provided within members 32 and 34. Tunnel assembly 36 does not have a heat source, enabling a compact and telescopic construction. However, heat supplied from members 32 and 34 provides a sufficient supply of heat within assembly 36 so that heat delivery to web 14 is reasonably uniform. Alternatively, it is possible to provide heating elements within assembly 36, pursuant to the heat sources disclosed below for use with members 32 and 34.

Leading oven member 32 of FIG. 1 is formed from an oven body 38 and an entry hood 40. Similarly, trailing oven member 34 is formed from an oven body 42 and an exit hood 44. Oven bodies 38 and 42 are formed from a plurality of structural frame members that are enclosed within a layer of exterior sheet metal. Similarly, hoods 40 and 42 are each formed from a folded sheet metal construction. Additionally, entry hood 40 and exit hood 42 each have a reduced-size mouth portion 46 which reduces heat loss from heat tunnel 12 at each end.

According to the construction of FIG. 1, leading oven member 32 and trailing oven member 34 are carried by a support frame (not shown) in relative movable relation along the axis of web 14. In this manner, the relative positions of members 32 and 34 can be adjusted, causing tunnel assembly 36 to telescope therebetween. Hence, assembly 36 can be lengthened or shortened. In this manner, the total length of the region 48 where heat is applied to web 14 can be adjusted to realize a desired heating of a shot length 50 of web that is to be formed in press 16. Preferably, shot length 50 is defined by the length of the foot print of press 16, and web 14 is advanced the same length as the shot length between successive forming cycles.

A control system 60 is provided including processing circuitry 62, memory 64, a control algorithm 66 stored in memory 64 and processed via processing circuitry 62 in order to implement control of heater elements 225, 226, 227 and 229 within heat tunnel 12. Thermal couples 68 are provided in distinct zones within heat tunnel 12 having conveyor rails 231 and one or more sag rails 233. Thermocouples 68 are each coupled with control system 60. A user interface 200 on control system 60 enables a user to interface with control system 60 via the screen displays depicted in FIGS. 2-14, as discussed below.

Figure 2:
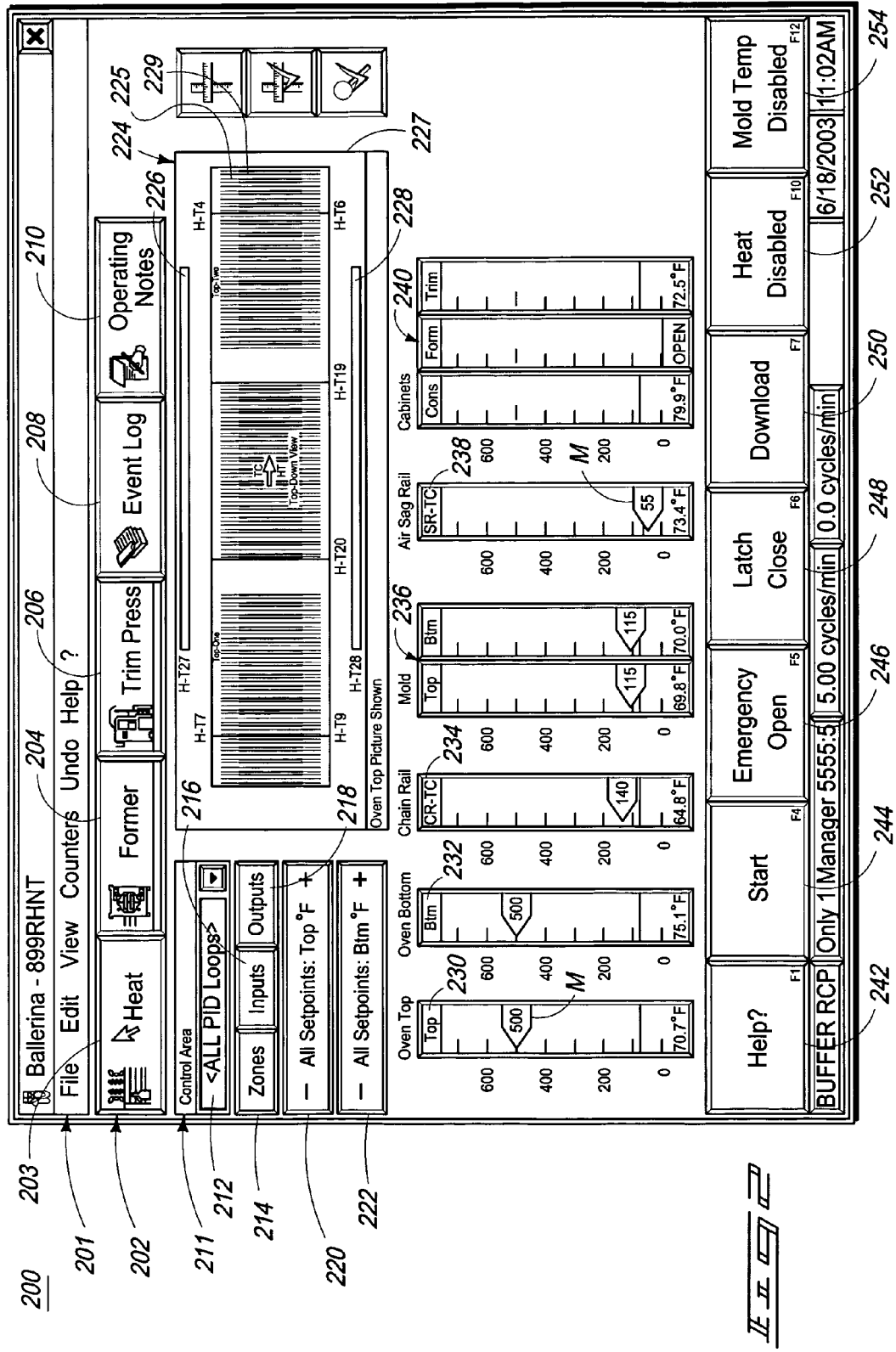
FIG. 2 is a diagram of a screen display for a thermoforming oven heater element control system illustrating an overall view of all PID loops for adjusting heater elements within the oven and further illustrating setpoint target control temperatures or zones within the oven, the chain rail, mold components, air sag rails, and cabinets for the thermoforming oven.

A user interface for a control system is depicted with reference to FIGS. 2-14 below. The user interface depicted herein provides for enhanced control of a plurality of heater elements provided within a specific zone of a heat tunnel (or oven) in order to more easily set a target setpoint temperature for the zone within the oven, and to achieve such setpoint temperature by way of a master that is provided within each zone of the oven. A master temperature is targeted using a temperature measurement taken with a thermocouple that is placed within the specific oven zone. User interface features enhance the ability to set this target value and to adjust the power that is delivered to individual heat elements within the zone. It is understood that one embodiment uses three different types of heat elements that deliver heat in different locations within the oven, taken along a transverse direction of the travel path of a web of material through the oven. For example, left heater elements 225, right heater elements 227, and center heater elements 229 can be mounted in an alternating configuration within an oven as shown in FIG. 2. Heat is predominantly generated at the respective left, right and center locations within the oven by these elements.

A control, user interface, and a method are described for controlling individual, unique heater elements within particular zones of a thermoforming oven or heat tunnel. Setpoint temperatures are easily set using the user interface for zones within the oven, after which equations or calculations are used to control a plurality of unique heating elements to achieve the setpoint temperature. In one case, the unique oven heating elements are pulsed in operation in order to achieve the desired setpoint temperature. In another case, resistance of current through the elements is varied to achieve the desired setpoint temperature (wattage adjustment).

FIGS. 2-14 illustrate various components that are controlled and regulated via the control system for a thermoforming oven.

U.S. Pat. No. 5,893,994 to Irwin, et al., issued Apr. 13, 1999, the teachings of which are incorporated herein by reference in their entirety, discloses one suitable thermoforming oven. However, three unique heating elements are used with the present heater control system; namely, left heater element 225, right heater element 227, and center heater element 229. More particularly, one heater element 225 provides a majority of heat on the left side, another heater element 227 provides a majority of heat on the right side, and a third heater element 229 provides heat in the center of the oven. By alternating positioning and power delivery to the three types of heater elements in an oven zone, the control system and user interface (e.g., Graphical User Interface) of the present invention can be utilized to realize a desired setpoint temperature using a top thermocouple and a bottom thermocouple that are provided within a top portion of the oven and a bottom portion of the oven, respectively.

The user interface feature disclosed as shown in FIGS. 2-14 enables realization of a desired temperature within an oven zone. More particularly, the user interface of the present invention enables a user to set a target setpoint temperature for one or more zones of the thermoforming oven while enabling the user to control or regulate the temperature for select zones of the thermoforming oven. The controlling or regulation of the oven temperature is performed graphically with a pointing device and/or keyboard via the user interface 200. The user interface 200 also allows users to tailor a computer system loaded with the user interface 200 to be managed locally or remotely, manipulating the operating characteristics of the oven 10 (FIG. 1). The manipulation comprises establishing a setpoint temperature for select individual zones of the oven (e.g., oven top and oven bottom), varying the temperature of the select individual temperature regulating devices (e.g., chain rail, sag rail, heating elements) by varying the menu driven controls such as, for example, dragging the setpoint markers of such temperature regulating devices, or varying the wattage provided to the heater elements. In a preferred embodiment, the temperature of the chain rail and the sag rail are regulated to a desired setpoint temperature using water and oil, respectively.

The user interface feature disclosed in FIGS. 2-14 enables realization of the desired temperature. Specifically, FIG. 2 shows a boot-up view of the user interface 200 and a diagram of a screen display for a thermoforming oven heater element control system illustrating an overall view of all PID loops for adjusting heater elements within the oven and further illustrating setpoint target control temperatures or zones within the oven, the chain rail, mold components, sag rails, and cabinets for the thermoforming oven. Depicted in FIG. 2 are the main components of the user interface 200, comprising a main menu tool bar 201, a button bar 202 having a plurality of icons or buttons 203, 204, 206, 208, and 210 related to heat, former, trim press, event log, and operating notes, respectively, and a control area 211.

As shown in FIG. 2, temperature gauges are illustrated for "Oven Top" and "Oven Bottom". An arrow within the respective temperature gauge defines a temperature setpoint for a master zone for the respective "Oven Top" section of the oven and the "Oven Bottom" section of the oven. Accordingly, as shown in FIG. 1, the setpoint temperatures for the "Oven Top" and "Oven Bottom" are each set at 500 degrees Fahrenheit. The control area 211 includes a pull-down menu bar 212 and various graphically represented icons for setting a desired setpoint temperature within individual zones (e.g., oven top portion, oven bottom portion). The control area 211 may be used for varying the temperature of select thermal regulating services (e.g., chain rail, sag rail, heater elements) in order to realize the desired setpoint temperature. Further details of the sag rail are disclosed in co-pending U.S. patent application Ser. No. 10/460,933, filed Jun. 12, 2003 and entitled "Web Conveyor and Web Supporting Apparatus", U.S. patent application Ser. No. 2004/0251295, published on Dec. 16, 2004, and which is incorporated by reference herein. It will be appreciated that depending on the access privileges provided to an operator or a user to control the thermoforming oven 10, more or less numbers of control icons may be displayed on the user interface.

The specific zones of the oven are then scaled to the setpoint temperature. A simple formula is used to calculate wattages for the three types of heating elements provided within each zone of the oven. Specific percentages of wattage are then calculated for powering the respective heater elements (left, right, and center) in order to realize the desired setpoint temperature. A thermocouple within the specific zone of the oven is used to monitor the realization of the desired setpoint temperature. The thermocouple serves as a master that is used to turn on and off the individual heating elements to a percentage of operation (or a percentage of total wattage) in order to realize a desired power output from each respective heater element that realizes the setpoint temperature for the zone of the oven (based upon the master value).

For example, in order to control or regulate temperature of the oven 10 (see FIG. 1) to heat a sheet or web of thermoformable material 14 (see FIG. 1) to thermal forming temperature, the menu driven heat button 203 is selected. Such a selection displays the graphically represented control icons that are used for establishing a setpoint temperature and for varying the temperature of individual temperature-regulating devices to realize the established setpoint temperature. Button 204 may be selected for using the interface controlling various features of the "former" device associated with the thermoforming oven 10. Likewise, button 206 may be selected to control the trim press. Selection of buttons 208 and 210 displays an event log for events, and operating notes, respectively, associated with the thermoforming oven 10.

As shown in FIG. 1, a first thermocouple is used for the top of the oven, whereas a second thermocouple is used for the bottom of the oven in order to realize an ideal temperature in the oven. Furthermore, positioning of the air within the temperature gauges is done in increments. For example, increments can be set such that the arrow moves in 5-degree Fahrenheit increments. As noted above, the control area 211 includes a pull-down menu 212 which enables a user to select either "All PID Loops" associated with zones 214, inputs 216, and outputs 218 of the oven 10. Further details of the zones 214, the inputs 216, and the outputs 218 are described with reference to FIGS. 4, 5, and 6, respectively.

The setpoint icons 220 and 222 may be used to vary (e.g., increase or decrease) setpoint temperature of various zones (e.g., top portion, bottom portion) of the oven 10. For example, a user or operator of the oven may increase or decrease the temperature of a top portion or a bottom portion of the oven in predetermined increments by clicking on the "+" or "−" sign of the setpoint icons 220, 222, respectively. The temperature of the top portion of the oven may also be varied by a user by selecting the marker "M" of the icon 230 and selecting a next incremental reading on the scale. The marker "M" correspondingly shifts in predetermined set increments (e.g., by 5° Fahrenheit.). In a similar manner, the temperature of the bottom zone of the oven, and temperature-regulating devices (e.g., sag rail, chain rail, mold) of the oven 10 can be varied.

The area shown by reference numeral 224 is a top down view of the inside of the oven 10. The area 224 is shown to include top one section, top two section, and the section between the top one and top two sections being the center section. Accordingly, the top portion of the oven 10 has three zones. The various sections are also alternatively referred to herein as zones. The area 224 also includes heater elements (e.g., quartz heaters) 226 and 228, respectively. The heater element 226 includes a thermocouple mounted thereon to determine a temperature of the top portion of the oven 10.

As shown in FIG. 2, temperature gauges are illustrated for "Oven Top" and "Oven Bottom". An arrow within the respective temperature gauge defines a temperature setpoint for a master zone for the respective "Oven Top" section of the oven and the "Oven Bottom" section of the oven. In one example, as shown in FIG. 2, the setpoint temperatures for the "Oven Top" and "Oven Bottom" are each set at 500° Fahrenheit.

The specific zones of the oven are then scaled to the setpoint temperature. A simple formula is used to calculate wattages for the various types of heating elements or temperature-regulating devices provided within each zone of the oven. In one case, three types of temperature-regulating devices may be used. Such heating elements or temperature-regulating devices comprise heater elements (e.g., left heater element 225, right heater element 227, and center heater element 229 of FIG. 2), sag rails, and chain rails. Specific percentages of wattage are then calculated for powering the respective heater elements in order to realize the desired setpoint temperature. The thermocouples provided in the "Oven Top" and "Oven Bottom" zones of the oven are used to monitor the realization of the desired setpoint temperature. The thermocouples serve as a master that is used to turn "on" and "off" the individual heating elements (e.g., heater elements, chain rail, sag rail) to a percentage of operation (or a percentage of total wattage) in order to realize a desired power output from each respective heater element that realizes the setpoint temperature for the zone of the oven (based upon the master value).

As noted above, a first thermocouple is used for the top of the oven, whereas a second thermocouple is used for the bottom of the oven in order to realize an ideal temperature in the oven. Furthermore, positioning of the markers "M" within the graphically represented temperature gauges for oven top 230, oven bottom 232, chain rail 234, mold 236, and sag rail 238 is done in increments. For example, increments can be set such that the marker "M", which is alternatively referred to as an "arrow", moves in 5° Fahrenheit increments. Other increment settings are possible.

The user interface 200 also displays other icons or buttons for realizing various other functions of the oven 10. Other such buttons include a help button 242, a start button 244, an emergency open button 246, a latch close button 248, a download button 250, a heat disabled button 252, and mold temperature disabled button 254.

Figure 3:
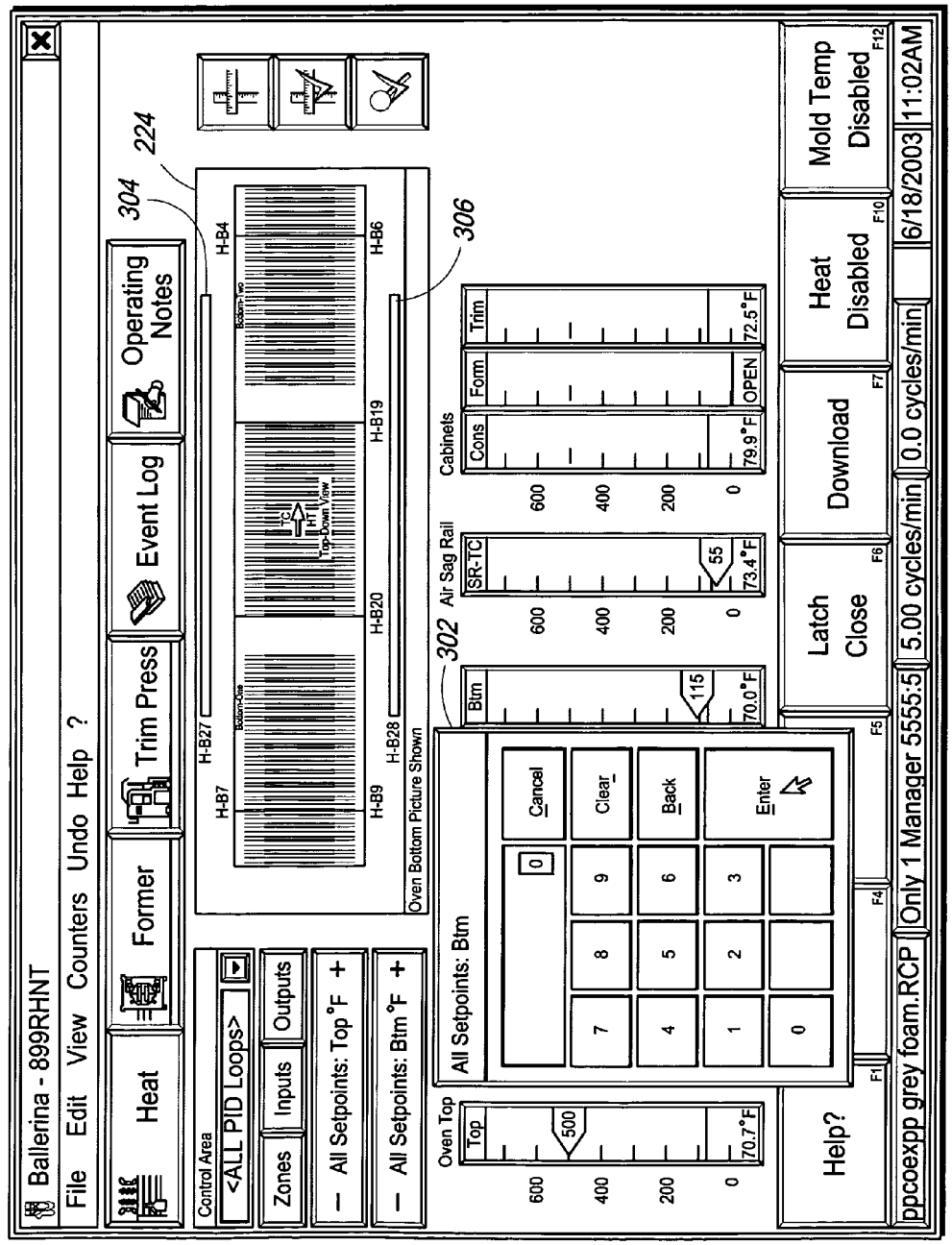
FIG. 3 is a diagram of a screen display generated by selecting the target temperature setpoint for the oven bottom in FIG. 2 which displays a pop-up user keyboard for inputting a temperature setpoint for the oven bottom.

Referring to FIG. 3, there is shown a diagram of a screen display generated by selecting the target temperature setpoint for the oven bottom in FIG. 2 wherein elements like those shown in FIG. 2 are identified using similar reference numerals. Similar to the zones included in the top zone of the oven 10, the bottom portion of oven 10 also includes multiple zones (e.g., bottom one, bottom two, and bottom center) as identified in area 224 in FIG. 3. A second thermocouple may be mounted on at least one of the heater elements (e.g., quartz heater element) 304 or 306 provided in a bottom portion of the oven 10. In one exemplary case, the temperature of the top or bottom portion of the oven may be varied in five-degree increments. Other incremental variations for the temperature are possible. Instead of selecting the marker "M" or the arrow to vary a setpoint temperature, the user may vary the setpoint temperature via a pop-up user keyboard. For example, FIG. 3 shows such keyboard 302 for inputting a temperature setpoint for the oven bottom.

Figure 4:
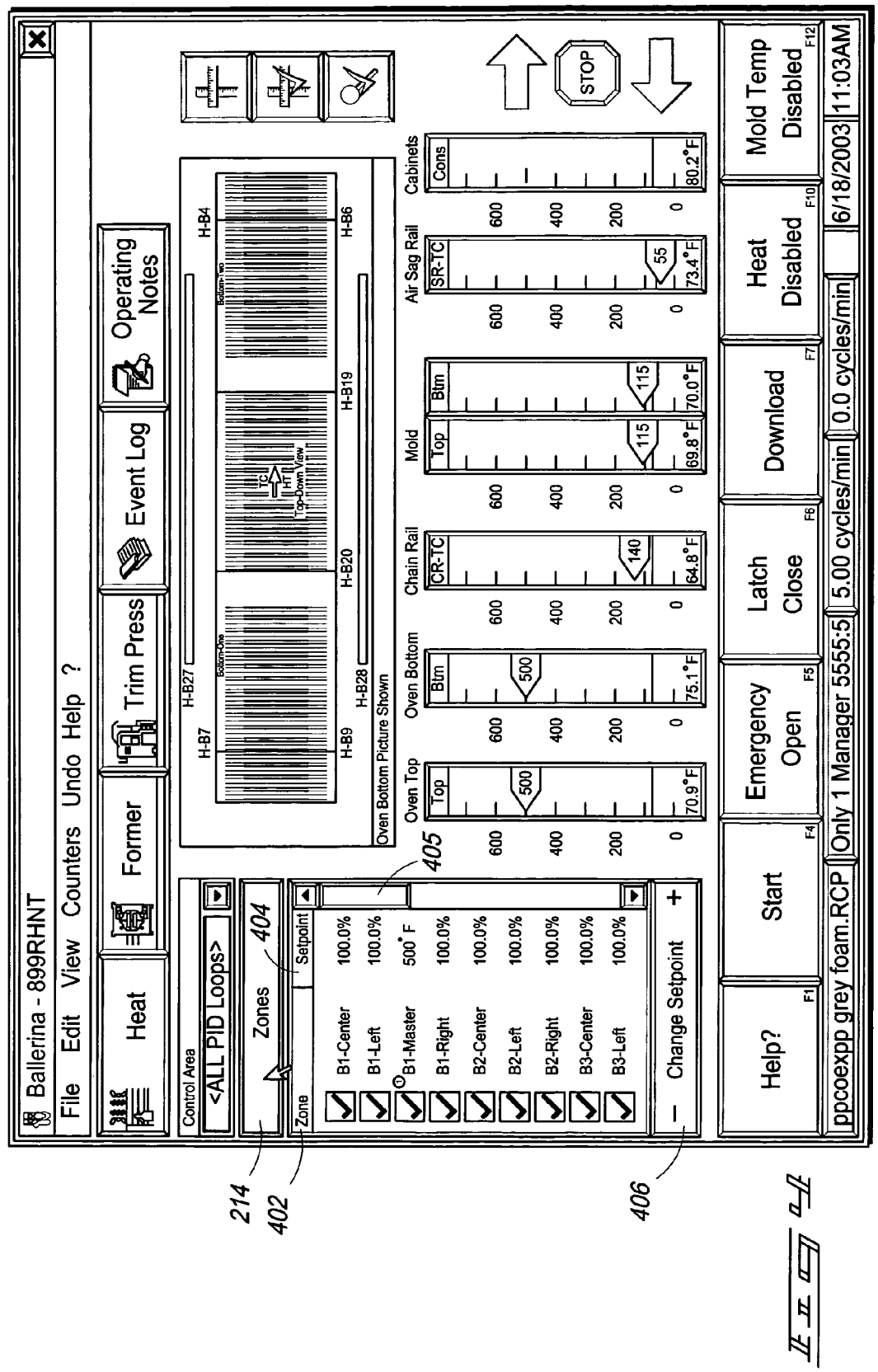
FIG. 4 is a diagram of a screen display for all the PID loops for the oven bottom for a master that is set at 500 degrees Fahrenheit setpoint, and illustrating the percentage setpoint and zones for the respective slave zones to the master within the oven bottom.

FIG. 4 is a diagram of a screen display for all the PID loops for the oven bottom for a master that is set at 500° Fahrenheit setpoint that illustrates the percentage setpoint and zones for the respective slave zones to the master within the oven bottom. Upon selection of the zones menu 214, a column 402 identified as "Zone" and another column 404 identified as "Setpoint" are displayed on the user interface 200. A listing of all of the zones, including a master, identified for the oven 10 is displayed under the column 402. A percentage setpoint of the slave zones relative to the master is displayed under the column 404. For example, if the temperature of the master of the bottom portion of the oven 10 is set at 500° Fahrenheit, then a center zone of the bottom portion is desired to be set at 100% relative to the temperature of the master, and so on. It will be appreciated that the listing of the zones illustrated under the column 402 is illustrative and not exhaustive. The listing of all of the zones that are not visible in the column 402 may be retrieved by appropriately moving the scroll bar 405 in a downward direction. The setpoint temperature of a specific zone from the list identified under the column 402 may be varied using the change setpoint button 406. As noted above with reference to FIGS. 2 and 3, an established setpoint may be varied in predetermined numerical increments or predetermined percentage increments.

Figure 5:
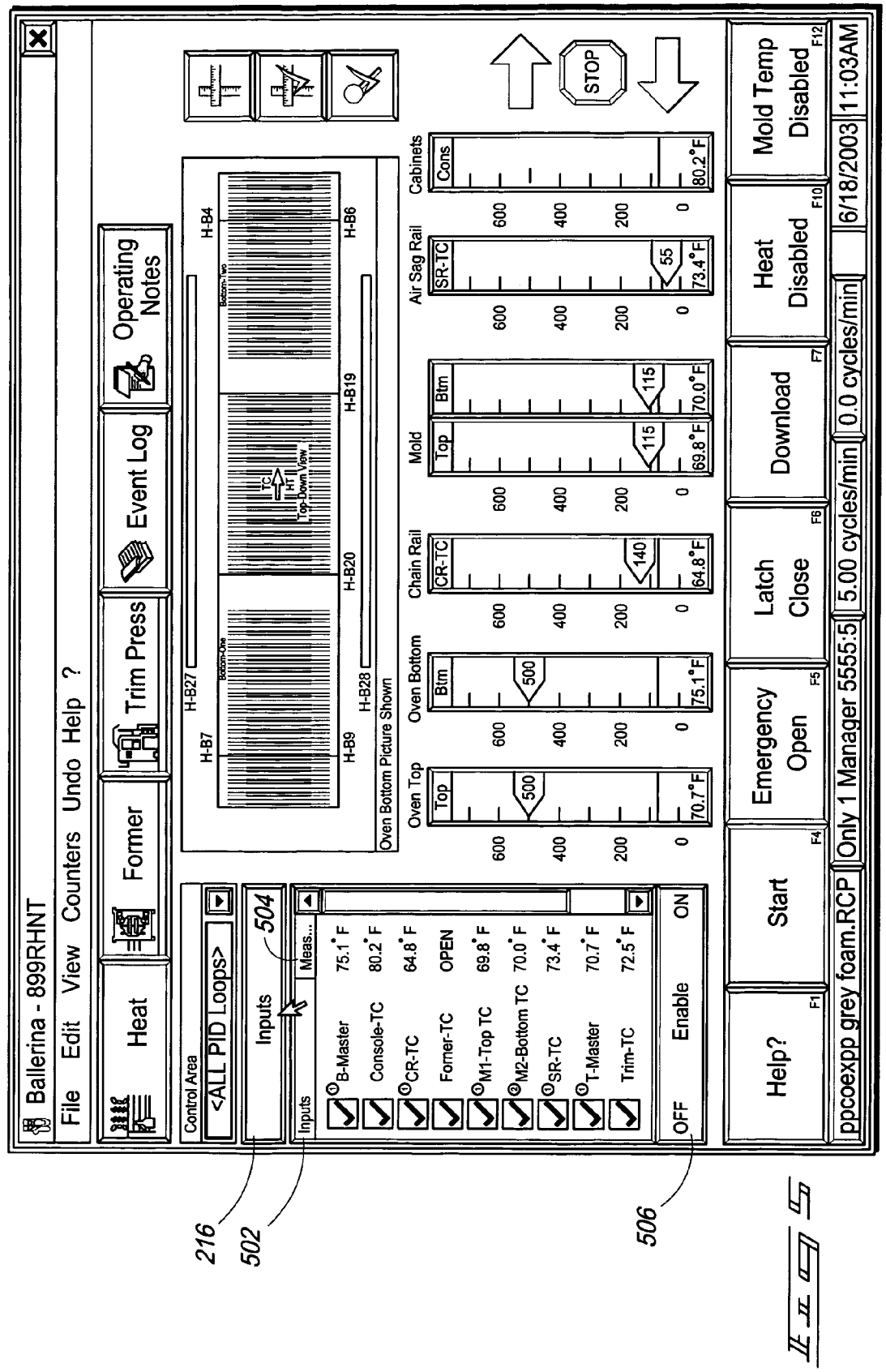
FIG. 5 is a diagram of a screen display for heater control system of FIGS. 2-4 and illustrating an input menu that provides input temperatures for the thermocouples present within the thermoforming heater.

FIG. 5 is a diagram of a screen display for the heater control system of FIGS. 2-4 and illustrates an input menu 216 that provides input temperatures for the thermocouples present within the thermoforming oven 10. Upon selection of the input menu 216, a column 502 identified as "Inputs" and another column 504 identified as "Maps" are displayed on the user interface 200. A listing of all of the inputs for the oven 10 is displayed under the column 502, and their corresponding temperature measurements are listed under the column 504. The temperature of a specific zone of the oven 10 may be regulated by selecting the zone from the list presented under the column 502 and turning "on" or "off" the selected zone using a button 506.

Figure 6:
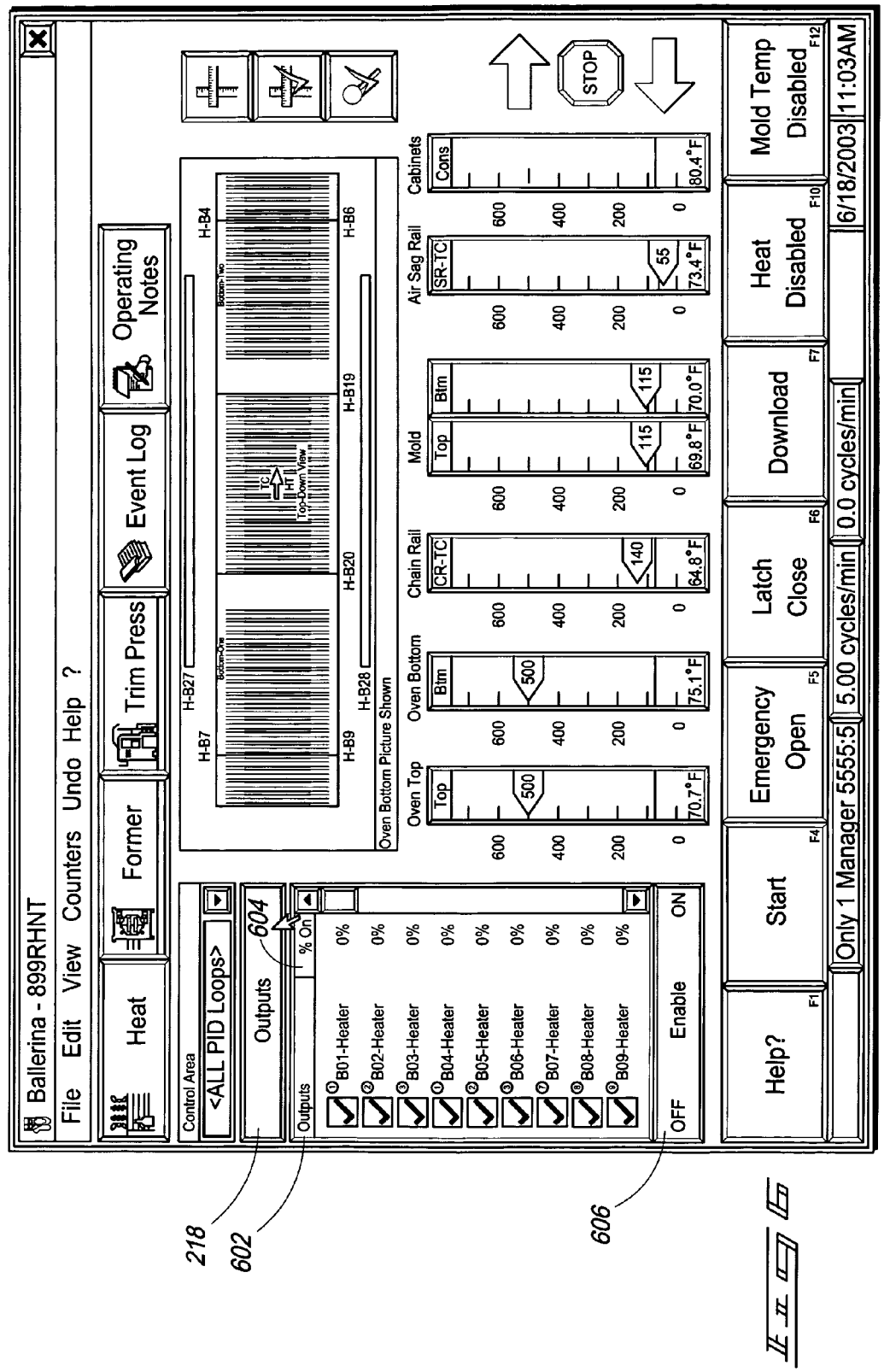
FIG. 6 is a diagram of a screen display for the heater control system of FIGS. 2-5 and illustrating an output menu for heater elements present within the oven bottom.

FIG. 6 is a diagram of a screen display for the heater control system of FIGS. 2-5 and illustrates an output menu for heater elements present within a bottom portion of the oven 10. A listing of the heater elements present within the bottom portion of the oven 10 is shown under a column 602 identified as "Output". Corresponding percentage measurements of the outputs are shown under a column 604 identified as "% On". A specific heater element from the list shown in column 602 may be selected by the user and such output may be turned on or off using button 606.

Figure 7:
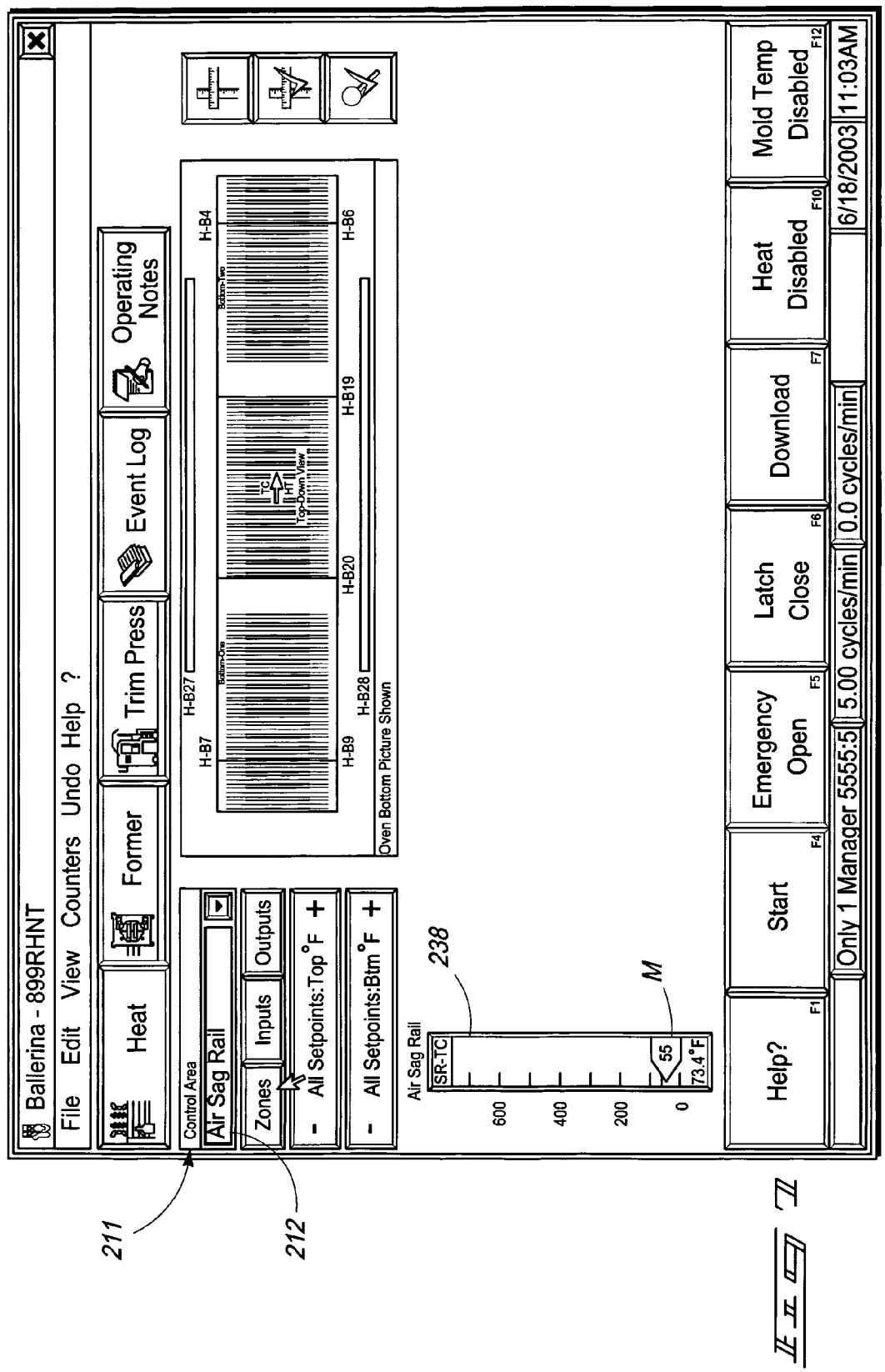
FIG. 7 is a diagram of a screen display for the heater control system of FIGS. 2-6 and illustrating a control menu for the air sag rail that includes an air sag rail temperature range having a temperature setpoint for the air sag rail.

FIG. 7 is a diagram of a screen display for the heater control system of FIGS. 2-6 and illustrates a control menu for the sag rail that includes a sag rail temperature range having a temperature setpoint for the sag rail. For example, from the control menu 211, the sag rail may be selected from the pull-down menu 212 in order to specifically retrieve graphically represented icon 238 to control a temperature of the sag rail. The sag rail temperature may be varied either by selecting the marker "M" to incrementally vary the temperature or via a pop-up keyboard menu such as menu 302 shown in FIG. 3.

Figure 8:
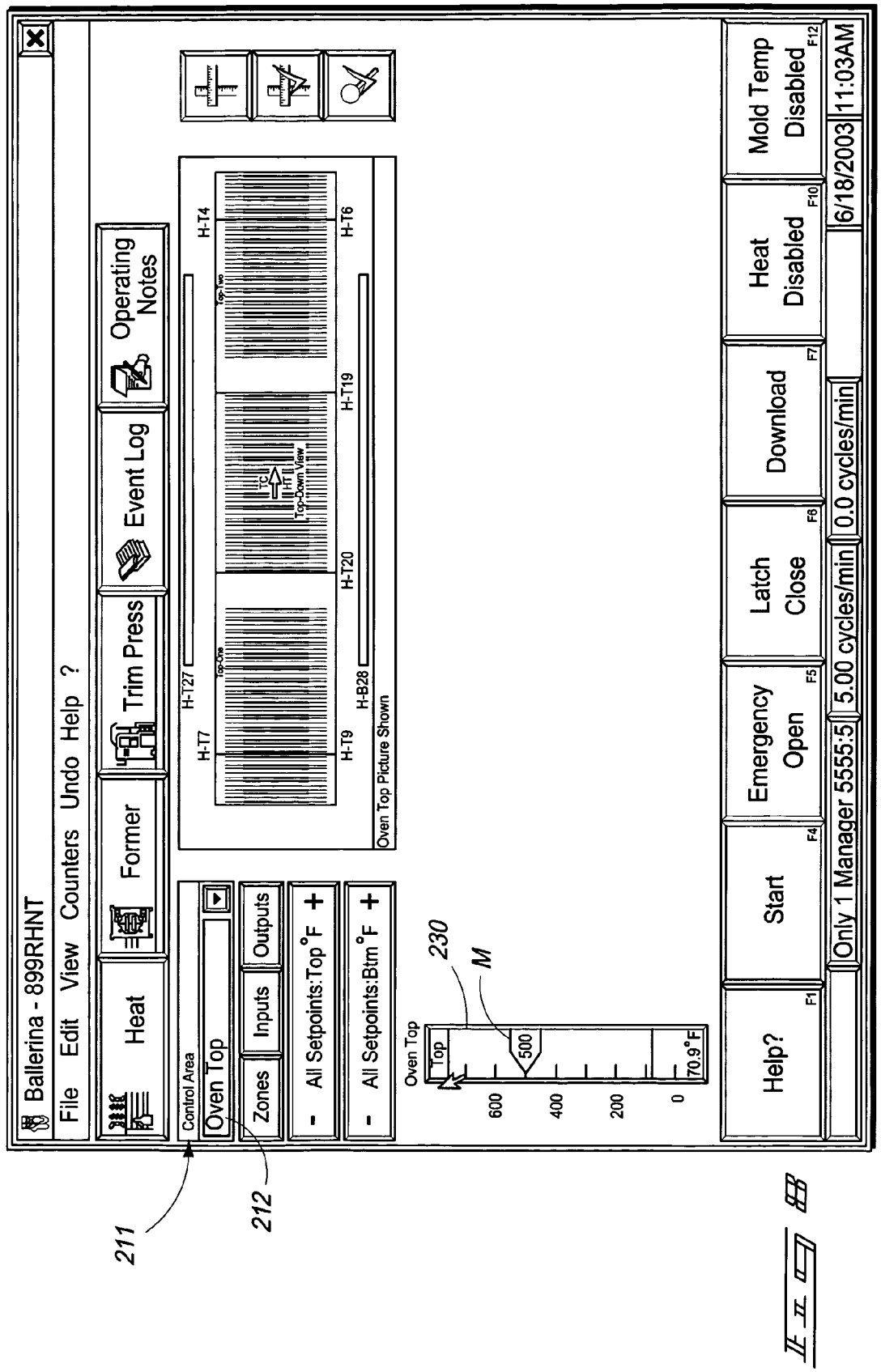
FIG. 8 is a diagram of a screen display for the heater control system of FIGS. 2-7 and illustrating a temperature range for the oven top section in which an oven top section temperature setpoint can be configured.

FIG. 8 is a diagram of a screen display for the heater control system of FIGS. 2-7 and illustrates a control menu for the top portion of the oven and a temperature range for the oven top section in which an oven top section temperature setpoint can be configured. The oven top temperature may be varied in the graphically illustrated icon 230 in a similar manner explained above with respect to FIG. 7 to vary the temperature of the sag rail.

Figure 9:
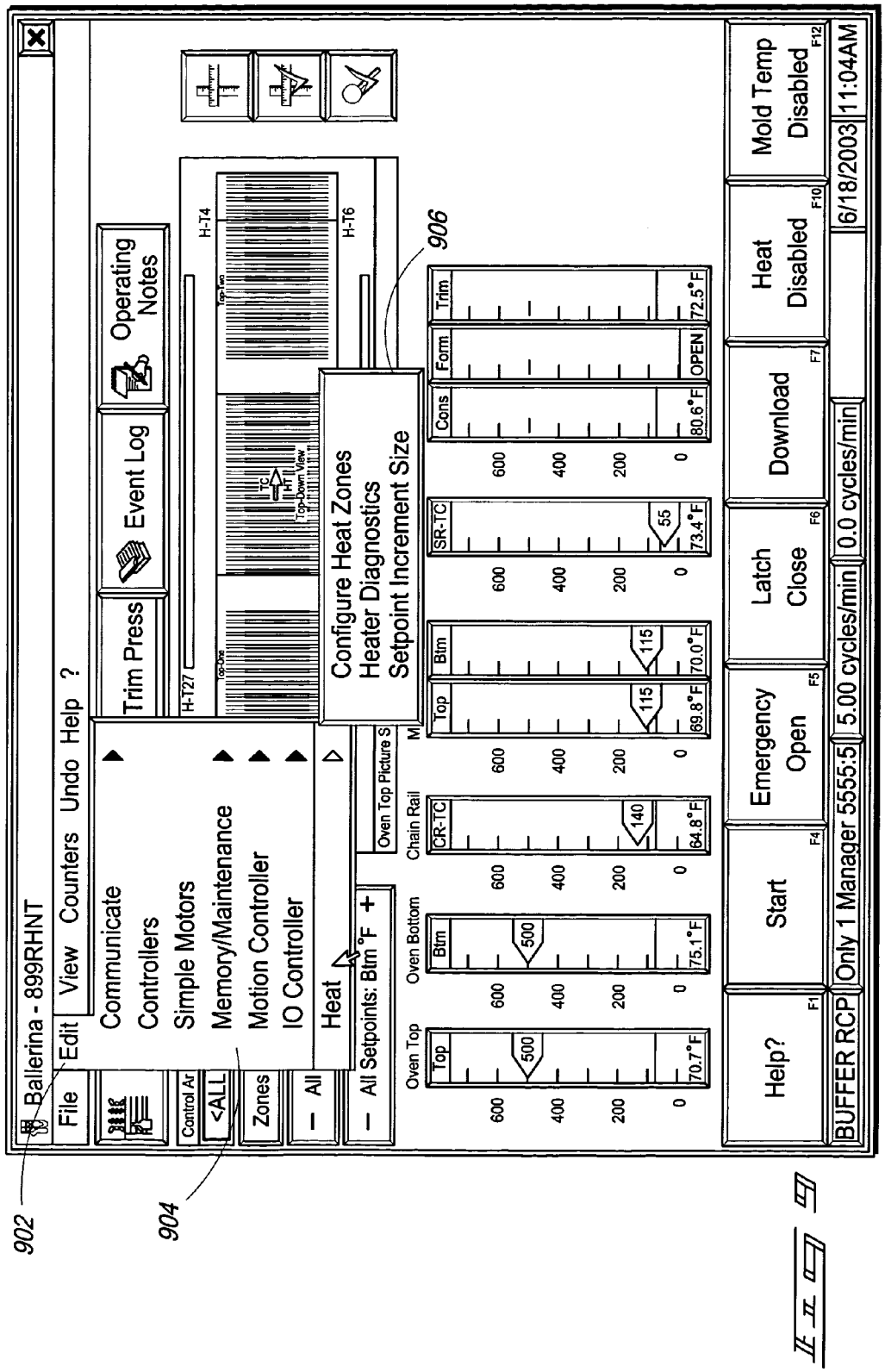
FIG. 9 is a diagram of a screen display for the heater control system of FIGS. 2-8 and illustrating a "Heat" pull-down menu that enables the user to "Configure Heat Zones", "Select Heater Diagnostics" for tailoring, and to set a "Setpoint Increment Size"

Referring now to FIG. 9, there is shown a diagram of a screen display for the heater control system of FIGS. 2-8 and illustrating other functions that can be performed using the user interface 200. Specifically, after selecting the "Edit" button 902, a pull-down menu 904 is displayed illustrating the various functions that are possible with the user interface 200. Within the pull-down menu 904, another "Heat" pull-down menu 906 is illustrated. The pull-down menu 906 enables the user to "Configure Heat Zones", "Select Heater Diagnostics" for tailoring, and to set a "Setpoint Increment Size".

Figure 10:
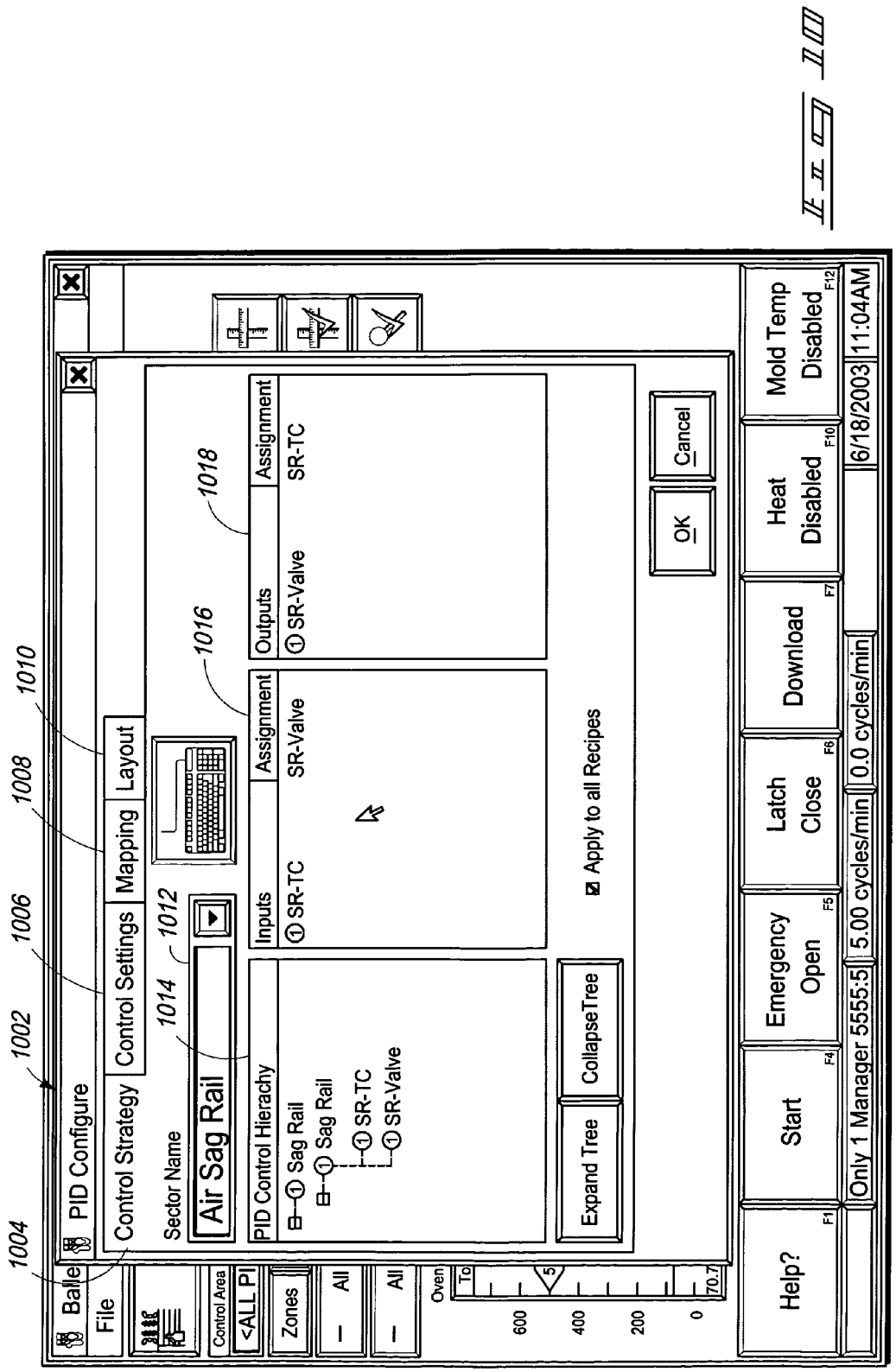
FIG. 10 is a diagram of a screen display of the heater control system of FIGS. 2-8 illustrating a PID Configure menu that allows a user to set a control strategy, set control settings, perform mapping, and set a layout for temperature-regulated components within the oven, such as the air sag rail (as well as the oven top and oven bottom)

FIG. 10 is a diagram of a screen display of the heater control system of FIGS. 2-9 illustrating a PID Configure menu 1002 that allows a user to set a control strategy by selecting the button 1004, set control settings using the button 1006, perform mapping using the button 1008, and set a layout for temperature-regulated components within the oven by using the button 1010. For example, a layout can be established for such temperature-regulated components as the sag rail, the chain rail, and heater elements disposed in the oven top and oven bottom zones. The PID Configure menu for the "sag rail" can be selected from the pull-down menu 1012. Upon such selection, the PID control hierarchy is displayed in window 1014; the inputs and the outputs relevant to the layout for the sag rail are displayed in windows 1016 and 1018, respectively.

Figure 11:
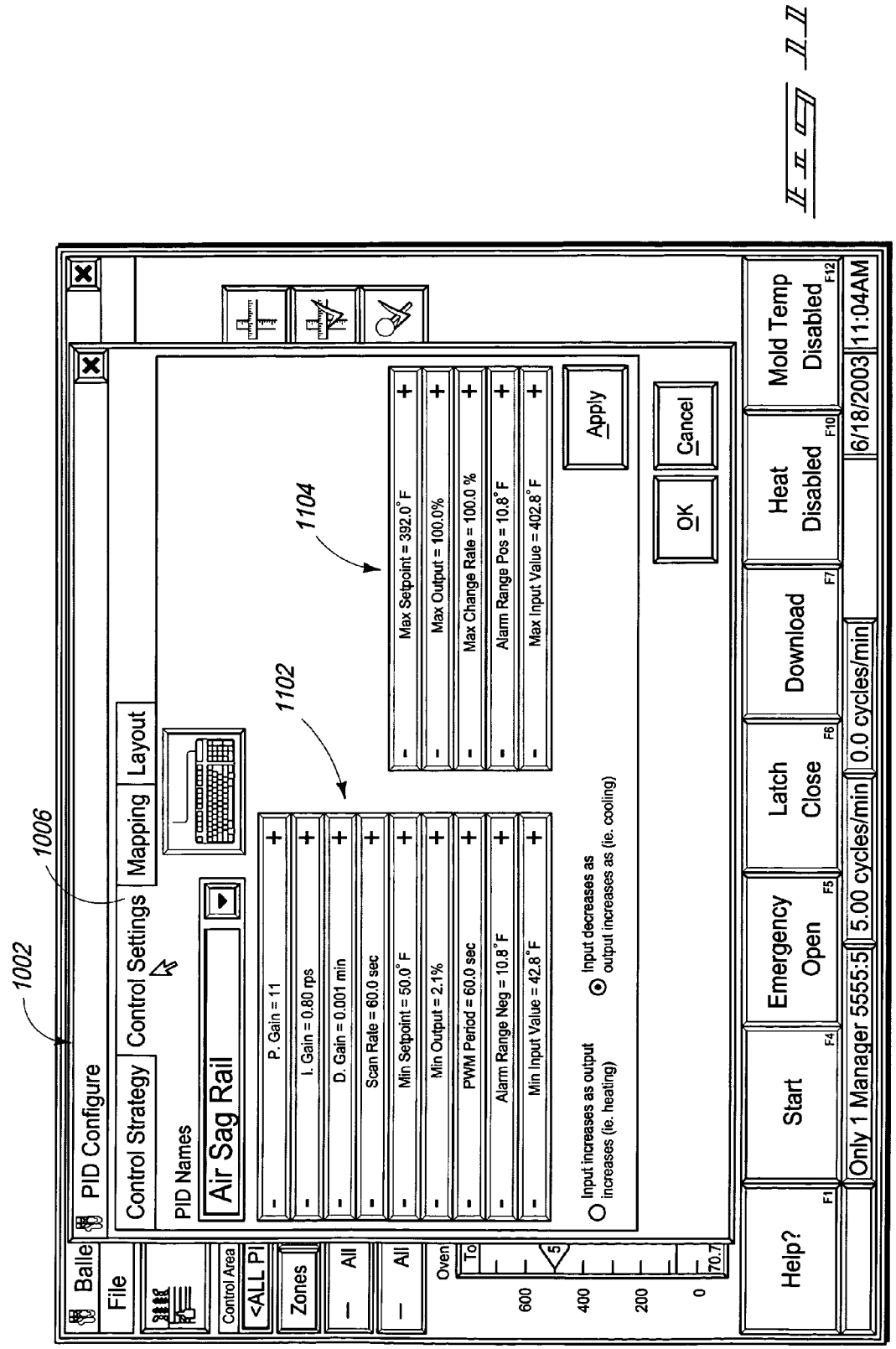
FIG. 11 is PID Configure menu for setting control settings for the air sag rails, enabling selection of control type criteria for temperature regulating the air sag rails.

FIG. 11 is PID Configure menu for setting control settings for the air sag rails, enabling selection of control type criteria for temperature regulating of the air sag rails. For example, upon selecting the control settings button 1006 from the PID Configure menu 1002, the various criteria for regulating the temperature of the sag rails are displayed in menus 1102 and 1104. Individual criteria displayed in the menus 1102 and 1104 may be varied in order to regulate the temperature of the sag rail relative to the setpoint temperature of a specific zone of the oven 10.

FIG. 12 is a diagram of a screen display of the heater control system of FIGS. 2-11 and further illustrates the PID Configure menu 1102 for the control strategy for the oven bottom section of the oven. The oven bottom section can be selected from the pull-down menu 1012. After the oven bottom section is selected, the PID control hierarchy, inputs and outputs as they are assigned to a specific master (or thermocouple) are shown in windows 1014, 1016, and 1018, respectively.

FIG. 13 is a diagram of a screen display for the heater control system of FIGS. 2-12 and illustrates a pop-up menu 1302 for setting "Setpoint Increment Size" for a heat increment for one of the elements of the oven such as, for example, the oven top, the oven bottom, the chain rail, or the sag rail. For example, the setpoint temperature of the oven top may be increased by selecting the graphically represented icon 230 and then further selecting the setpoint increment size as shown in FIG. 9 and described above with reference to such figure. Once the pop-up menu 1302 is displayed, the setpoint of the selected zone or temperature-regulating device can be incremented up or down using menu 1302. Once the pop-up menu 1302 is displayed, the setpoint of the selected zone or temperature-regulating device may be varied in numerical increments (up or down) using the button 1304. The setpoint temperature may be adjusted in degrees using the button 1306 or it may be adjusted as a percentage using the button 1308. The setpoint increment size of other zones such as oven bottom, chain rail, etc. may be similarly adjusted.

FIG. 14 is a diagram of a screen display for the heater control system of FIGS. 2-13 and further illustrates a heat increment calculator window 1402 that is displayed after selecting the "Adjust Degrees" button 1306 from the "Setpoint Increment Size" window of FIG. 13. In this embodiment, rather than increasing the setpoint by predetermined heat increments, a user may enter the desired incremental value in the window 1402 to increase the setpoint size.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A control system for controlling the temperature of a thermoforming oven, comprising:
    a plurality of temperature sensors, one provided within select individual zones of the oven and configured to provide a master input for the zone;
    a plurality of temperature-regulating devices at least some of which are located in select individual zones of the thermoforming oven, the plurality of temperature-regulating devices being individually configured to regulate the temperature of the thermoforming oven;
    a controller having a user interface, processing circuitry, memory, and a control algorithm, a recipe provided in the memory correlating operating control settings for each of the temperature-regulating devices within each select individual zone, the user interface including a configuration menu with control settings for selecting a control strategy to select a target setpoint temperature value and adjust power delivered to each of the plurality of temperature-regulating devices in the selected individual zone responsive to a detected temperature value from the master input for the zone;
    wherein the selected target setpoint temperature of the select individual zones is set by a user, and the target setpoint temperature is realized by controlling the temperature of one or more of the temperature-regulating devices pursuant to the recipe correlating operating control settings for the temperature regulating devices within each select individual zone.

2. The control system of claim 1, further comprising:
    a thermocouple disposed in at least some of the individual zones of the thermoforming oven to monitor a realized temperature within the respective individual zones.

3. The control system of claim 2, wherein the temperature of the individual zones of the thermoforming oven is realized using a proportional integral differential (PID) loop that is configured to be adjustable for the one or more of the temperature-regulating devices.

4. The control system of claim 2, wherein the plurality of temperature-regulating devices comprise a chain rail, a sag rail, and a plurality of heater elements.

5. The control system of claim 4, wherein the individual zones of the thermoforming oven comprise a top zone, a bottom zone, and at least some of the heater elements are disposed in the top zone and the bottom zone.

6. The control system of claim 5, wherein a master temperature of the thermoforming oven is established by selectively controlling the temperature of the heater elements disposed in the top zone and the bottom zone.

7. The control system of claim 6, wherein the temperature of the thermoforming oven is regulated by varying the temperature of select individual zones of the oven as a percentage variation relative to the master temperature.

8. The control system of claim 1, wherein the user interface is configured to display a control icon based on access privileges being granted responsive to user identification.

9. The control system of claim 8, wherein the control icons at the user interface enable restricted access to vary temperature settings and setpoint configurations of the select individual zones of the thermoforming oven.

10. The control system of claim 1, wherein the temperature of the one or more of the temperature-regulating devices is varied by adjusting the temperature in predetermined degree increments.

11. The control system of claim 1, wherein the temperature of the temperature-regulating devices is varied by varying the power supplied to the temperature-regulating devices.

12. The control system of claim 1, wherein the temperature of the temperature-regulating devices is controlled via a user interface.

13. The control system of claim 12, wherein selections made via the user interface are transferred to the oven to regulate the one or more temperature-regulating devices in order to realize the target setpoint temperature.

14. The control system of claim 1, wherein the target setpoint temperature provides a virtual heat set point for the oven and the virtual heat set point is realized by controlling the one or more temperature-regulating devices to realize a desired setpoint temperature within a specific individual zone of the thermoforming oven.

15. The control system of claim 1, wherein regulating the temperature of the thermoforming oven comprises at least one of cooling or heating the temperature-regulating devices.

16. A user interface for controlling the temperature of a thermoforming oven, comprising:
  a controller having a user interface, processing circuitry, and memory, the user interface having a configuration menu with control settings for selecting a control strategy that is stored in a memory location of the memory as a recipe, the control strategy operative to select a target setpoint temperature value and adjust power delivered to a plurality of temperature-regulating devices responsive to a feedback signal from a master input to the controller;
  a plurality of menu driven icons individually configured to control one or more functions of the thermoforming oven, at least some of the icons being configured to establish a target setpoint temperature for individual zones of the thermoforming oven, the oven including at least a plurality of temperature-regulating devices individually configured to regulate the temperature of the thermoforming oven and at least one temperature sensor configured to generate the master input in the form of the feedback signal to the controller;
  wherein the user interface is configured to realize the target setpoint temperature by controlling one or more of the temperature-regulating devices pursuant to the recipe in the memory allocation.

17. The user interface of claim 16, wherein the temperature of the thermoforming oven is regulated by realizing the temperature within the individual zones using a thermocouple.

18. The user interface of claim 17, wherein the temperature of the individual zones is realized using a proportional integral differential (PID) loop configured to be adjustable for the one or more temperature-regulating devices.

19. The user interface of claim 16, wherein the plurality of temperature-regulating devices comprises a chain rail, a sag rail, and a plurality of heater elements.

20. The user interface of claim 16, wherein the temperature of the thermoforming oven is regulated by varying the temperature of select individual zones of the thermoforming oven as a percentage variation relative to an established master temperature.

21. The user interface of claim 16, wherein the user interface is configured to display a control icon responsive to the control system identifying a user that has been assigned access privileges.

22. The user interface of claim 21, wherein the control icons of the user interface enable access to vary temperature settings and setpoint configurations of the individual zones of the thermoforming oven.

23. The user interface of claim 16, wherein the temperature of the one or more temperature-regulating devices is varied by adjusting the temperature in predetermined degree increments and via the menu driven icons of the user interface.

24. The user interface of claim 16, wherein the temperature of the one or more temperature-regulating devices is varied by regulating the power supplied to the temperature-regulating devices.

25. The user interface of claim 16, wherein selections made via the user interface are transferred to the thermoforming oven to control the one or more temperature-regulating devices in order to realize the target setpoint temperature.

26. The user interface of claim 16, wherein the target setpoint temperature provides a virtual heat set point for the thermoforming oven and the virtual heat set point is realized by controlling the one or more temperature-regulating devices to realize a desired setpoint temperature within a specific individual zone of the thermoforming oven.

27. The user interface of claim 16, wherein regulating the temperature of the thermoforming oven comprises at least one of cooling or heating the temperature-regulating devices.

28. The user interface of claim 16, further comprising:
  a main menu tool bar having the menu driven control icons; and
  a control area including a pull-down menu configured to select the individual zones of the thermoforming oven to regulate the temperature of the selected individual zones;
  wherein the temperature of the selected individual zones is regulated by varying at least one of a displayed graphical representation of a temperature marker or by varying the temperature in setpoint increments via a pop-up menu.

29. A sag rail temperature regulation system for controlling the temperature of a thermoforming oven, comprising:
  a controller having processing circuitry and memory;
  a recipe provided in the memory correlating operating control settings for each of the temperature-regulating devices within each select individual zone;

a user interface having a configuration menu with control settings for selecting a control strategy to select a target setpoint temperature value and adjust power delivered to the plurality of temperature-regulating devices including a plurality of menu driven icons individually configured to control one or more functions of the thermoforming oven, at least some of the icons being configured to establish a target setpoint temperature for select individual zones of the thermoforming oven, and at least one of the individual zones having a sag rail provided therein for temperature regulation;

wherein the target setpoint temperature is set via the user interface, and the target setpoint temperature is realized by regulating temperature of the sag rail pursuant to the recipe.

30. The sag rail temperature regulation system of claim 29, further comprising:

a thermocouple disposed in at least some of the individual zones of the thermoforming oven to monitor a realized temperature within the respective individual zones.

31. The sag rail temperature regulation system of claim 30, wherein the temperature of the individual zones of the thermoforming oven is realized using a proportional integral differential (PID) loop.

32. The sag rail temperature regulation system of claim 30, wherein access to the select individual zones is provided by the controller.

33. The sag rail temperature regulation system of claim 30, wherein the temperature of the thermoforming oven is regulated by regulating the power supplied to the sag rail.

34. The sag rail temperature regulation system of claim 30, wherein the temperature of the thermoforming oven is regulated by at least one of cooling or heating the sag rail.

35. A thermoforming oven thermal regulating circuit, comprising:

a chain rail, a sag rail, and a plurality of heater elements, wherein the chain rail, the sag rail, and the plurality of heater elements are selectively disposed in individual zones of a thermoforming oven;

a controller having processing circuitry and memory;

a recipe provided in the memory correlating control settings for each of the temperature-regulating devices within select ones of the individual zones; and a user interface having a configuration menu with control settings for selecting a control strategy to select a target setpoint temperature value and adjust power delivered to the plurality of temperature-regulating devices including a plurality of menu driven icons configured to establish a setpoint temperature of the thermoforming oven, the user interface further configured to realize the established setpoint temperature by selectively controlling the temperature of the chain rail, the sag rail, and select ones of the plurality of heater elements according to the recipe.

36. The thermal regulating circuit of claim 35, further comprising:

a thermocouple disposed in at least some of the individual zones of the thermoforming oven to monitor a realized temperature within the respective individual zones.

37. The thermal regulating circuit of claim 35, wherein the temperature of the individual zones of the thermoforming oven is realized using a proportional integral differential (PID) loop.

38. The thermal regulating circuit of claim 35, wherein access to the select individual zones of the thermoforming oven is provided by the controller.

39. A system for regulating temperature in a thermoforming oven, comprising:

a plurality of thermal regulating devices provided in the thermoforming oven; and a user interface including a configuration menu with control settings for selecting a control strategy from one of a plurality of uniquely configured control strategies to select a target setpoint temperature value and adjust power delivered to the plurality of temperature-regulating devices according to the selected control strategy configured to selectively control the temperature of the regulating devices to regulate the temperature of the thermoforming oven.

40. The system of claim 39, wherein select ones of the thermal regulating devices are provided in individual zones of the thermoforming oven.

41. The system of claim 39, wherein the thermal regulating devices comprise heater elements, a sag rail, and a chain rail.

42. A thermoforming oven temperature regulation method, comprising:

providing processing circuitry, memory, and a user interface, the memory configurable to store a recipe defining relative power delivery values for each of a plurality of temperature-regulating devices within an oven zone, the user interface including a configuration menu with control settings for selecting a specific control strategy by retrieving the recipe from memory to select a target setpoint temperature value and adjust power delivered to the plurality of temperature-regulating devices;

displaying a menu configuration having a plurality of control icons on the user interface;

selecting one or more temperature-regulating devices using the control icons, the one or more temperature-regulating devices being provided in individual zones of the thermoforming oven;

selectively regulating the temperature of the one or more temperature-regulating devices via the user interface by manipulating a graphical gauge to control the temperature of the thermoforming oven; and storing values corresponding from the manipulated graphical gauge in the memory as a specific recipe.

43. The method of claim 42, further comprising disposing a thermocouple in at least some of the individual zones of the oven to monitor a realized temperature, wherein the temperature of the individual zones of the oven is realized using a proportional integral differential (PID) loop that is configured to be adjustable for the one or more of the temperature-regulating devices.

44. The method of claim 42, wherein the temperature-regulating devices comprise a chain rail, a sag rail, and a plurality of heater elements.

45. The method of claim 44, wherein the regulating comprises establishing a master temperature by controlling the temperature of select ones of the plurality of heater elements, and regulating the temperature of the individual zones as a percentage variation relative to the master temperature.

46. The method of claim 44, wherein the regulating of the temperature comprises varying the temperature in predetermined degree increments.

47. The method of claim 42, wherein the regulating is performed by manipulating the graphical gauge to vary temperature settings and setpoint configurations, and the user interface comprising:

a main menu tool bar having a plurality of control icons configured to control a select characteristic of the thermoforming oven;

a control section including pull-down menu configured to select the individual zones of the oven, the temperature of the individual zones being regulated by varying at least one of a displayed graphical representation of a temperature marker or by varying the temperature in setpoint increments via a pop-up menu.

48. A thermoforming oven temperature regulation method using a user-interface, the method comprising:

providing a control system and a plurality of temperature-regulating devices at least some of which being located in a thermoforming oven and a configuration menu with control settings for selecting a control strategy to realize a target setpoint temperature value, store the control strategy as a recipe in memory of the control system, and adjust power delivered to the plurality of temperature-regulating devices based on the control strategy of the recipe;

setting a target setpoint temperature for the thermoforming oven via the user interface using a graphical gauge; and realizing the target setpoint temperature by controlling the temperature of at least some of the temperature-regulating devices via the control strategy of the recipe via the user interface.

49. The method of claim 48, wherein the realizing the target setpoint temperature comprises using a proportional integral differential (PID) loop that is configured to be adjustable for the one or more of the temperature-regulating devices.

50. The method of claim 48, wherein the temperature-regulating devices comprise a chain rail, a sag rail, and a plurality of heater elements.

51. The method of claim 48, wherein realizing the target setpoint temperature comprises varying the temperature of a select number of the temperature-regulating devices as a percentage variation relative to a reference temperature.

52. The method of claim 48, wherein access to the select individual zones of the oven is provided by the configuration menu on a restricted basis.

* * * * *